United States Patent
Chen et al.

(10) Patent No.: US 11,620,269 B2
(45) Date of Patent: Apr. 4, 2023

(54) METHOD, ELECTRONIC DEVICE, AND COMPUTER PROGRAM PRODUCT FOR DATA INDEXING

(71) Applicant: EMC IP Holding Company LLC, Hopkinton, MA (US)

(72) Inventors: Qiang Chen, Shanghai (CN); Jing Yu, Shanghai (CN); Pengfei Wu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 366 days.

(21) Appl. No.: 16/916,693

(22) Filed: Jun. 30, 2020

(65) Prior Publication Data

US 2021/0374114 A1    Dec. 2, 2021

(30) Foreign Application Priority Data

May 29, 2020 (CN) .......................... 202010479672.0

(51) Int. Cl.
*G06F 16/22* (2019.01)
*G06N 3/02* (2006.01)
*G06K 9/62* (2022.01)

(52) U.S. Cl.
CPC ....... *G06F 16/2228* (2019.01); *G06K 9/6257* (2013.01); *G06K 9/6276* (2013.01); *G06N 3/02* (2013.01)

(58) Field of Classification Search
CPC .. G06F 16/2228; G06K 9/6257; G06K 9/627; G06K 9/6276; G06N 3/02; G06N 3/0445; G06N 3/0454; G06N 3/08; G06N 3/00; G06N 5/00; G06N 7/00; G06N 10/00; G06N 20/00; G06N 99/00
See application file for complete search history.

(56) References Cited

U.S. PATENT DOCUMENTS

| 5,594,813 A | * | 1/1997 | Fandrianto | ........... | H04N 19/433 |
| | | | | | 375/E7.113 |
| 6,005,625 A | * | 12/1999 | Yokoyama | ........... | H04N 19/543 |
| | | | | | 375/E7.111 |
| 6,993,532 B1 | * | 1/2006 | Platt | ..................... | G06F 16/639 |
| | | | | | 707/916 |

(Continued)

*Primary Examiner* — Peter D Le
(74) *Attorney, Agent, or Firm* — Womble Bond Dickinson (US) LLP

(57) ABSTRACT

Embodiments of the present disclosure provide a method, an electronic device, and a computer program product for data indexing. The method for data indexing includes obtaining a plurality of data blocks for storage. The method further includes generating a plurality of vectorized representations of the plurality of data blocks so that a difference between vectorized representations of data blocks with a higher similarity among the plurality of data blocks is smaller. The method further includes storing the plurality of vectorized representations for indexing the plurality of data blocks respectively. The vectorized representations serve as indexes of the data blocks, and the vectorized representations may be used to effectively measure similarities between the data blocks, thereby providing the possibility of performing a fuzzy search of the data blocks based on the similarities.

20 Claims, 6 Drawing Sheets

(56) References Cited

U.S. PATENT DOCUMENTS

| | | | | |
|---|---|---|---|---|
| 8,774,509 B1* | 7/2014 | Yagnik | | G06K 9/6218 |
| | | | | 382/218 |
| 10,055,685 B1* | 8/2018 | Arel | | G06N 20/00 |
| 10,129,456 B1* | 11/2018 | Kim | | H04N 5/23212 |
| 10,318,306 B1* | 6/2019 | Kohn | | G06F 9/5044 |
| 10,338,902 B1* | 7/2019 | Sevigny | | G06F 8/436 |
| 10,491,912 B1* | 11/2019 | Xu | | H04N 19/172 |
| 10,855,881 B1* | 12/2020 | Kailey | | G06K 15/1881 |
| 11,087,511 B1* | 8/2021 | Vallespi | | G06T 11/00 |
| 11,163,956 B1* | 11/2021 | De Peuter | | G06F 40/295 |
| 11,263,523 B1* | 3/2022 | Duchon | | G06N 3/0445 |
| 2001/0003182 A1* | 6/2001 | Labelle | | G06V 10/507 |
| | | | | 707/E17.02 |
| 2001/0017941 A1* | 8/2001 | Chaddha | | G06T 9/008 |
| | | | | 382/236 |
| 2001/0046264 A1* | 11/2001 | Fandrianto | | G06T 9/007 |
| | | | | 348/E7.083 |
| 2002/0031181 A1* | 3/2002 | Doux | | H04N 19/51 |
| | | | | 375/E7.263 |
| 2002/0091738 A1* | 7/2002 | Rohrbaugh | | G06F 16/986 |
| | | | | 715/205 |
| 2003/0059108 A1* | 3/2003 | Hubei | | H04N 1/6094 |
| | | | | 382/165 |
| 2004/0098225 A1* | 5/2004 | Abe | | G06V 10/75 |
| | | | | 702/181 |
| 2004/0197023 A1* | 10/2004 | Yagi | | G06V 30/18095 |
| | | | | 382/224 |
| 2004/0218675 A1* | 11/2004 | Kim | | H04N 19/137 |
| | | | | 375/E7.149 |
| 2005/0084154 A1* | 4/2005 | Li | | G06V 20/10 |
| | | | | 348/231.2 |
| 2005/0100229 A1* | 5/2005 | Becker | | H04N 19/186 |
| | | | | 375/E7.049 |
| 2005/0271156 A1* | 12/2005 | Nakano | | H04N 19/61 |
| | | | | 375/265 |
| 2005/0286786 A1* | 12/2005 | Noda | | H04N 19/194 |
| | | | | 375/E7.176 |
| 2006/0039617 A1* | 2/2006 | Makai | | H04N 19/70 |
| | | | | 382/232 |
| 2006/0190254 A1* | 8/2006 | Iser | | G10L 21/038 |
| | | | | 704/243 |
| 2007/0147506 A1* | 6/2007 | Kwon | | G06T 7/223 |
| | | | | 348/E5.065 |
| 2009/0097765 A1* | 4/2009 | Kimura | | G06V 30/182 |
| | | | | 382/243 |
| 2009/0148042 A1* | 6/2009 | Fan | | H04N 1/41 |
| | | | | 382/176 |
| 2009/0234820 A1* | 9/2009 | Kaburagi | | G06F 16/248 |
| | | | | 707/E17.02 |
| 2009/0297024 A1* | 12/2009 | Dai | | G06V 30/413 |
| | | | | 382/199 |
| 2011/0222781 A1* | 9/2011 | Nguyen | | G06V 10/7715 |
| | | | | 382/218 |
| 2012/0099774 A1* | 4/2012 | Akcakaya | | G06T 5/002 |
| | | | | 382/131 |
| 2012/0230586 A1* | 9/2012 | Blennerhassett | | G06T 9/20 |
| | | | | 382/173 |
| 2013/0044183 A1* | 2/2013 | Jeon | | H04N 19/103 |
| | | | | 375/240.03 |
| 2015/0097565 A1* | 4/2015 | Basha | | G01R 33/4824 |
| | | | | 324/318 |
| 2015/0348279 A1* | 12/2015 | Fishwick | | G06T 7/238 |
| | | | | 382/107 |
| 2017/0228641 A1* | 8/2017 | Sohn | | G06N 3/04 |
| 2017/0286811 A1* | 10/2017 | Shafer | | G06V 30/36 |
| 2017/0316545 A1* | 11/2017 | Kjeldergaard | | G06T 3/40 |
| 2018/0211401 A1* | 7/2018 | Lee | | G06V 10/751 |
| 2018/0218429 A1* | 8/2018 | Guo | | G06V 30/194 |
| 2018/0349716 A1* | 12/2018 | Park | | G06K 9/627 |
| 2019/0188539 A1* | 6/2019 | Lee | | G06V 30/19173 |
| 2020/0007885 A1* | 1/2020 | Kondo | | H04N 19/587 |
| 2020/0221122 A1* | 7/2020 | Ye | | H04N 19/139 |
| 2020/0244969 A1* | 7/2020 | Bhorkar | | H04N 19/147 |
| 2020/0285808 A1* | 9/2020 | Yoshida | | G06F 40/242 |
| 2020/0380295 A1* | 12/2020 | Natsumeda | | G06K 9/0055 |
| 2020/0411164 A1* | 12/2020 | Donner | | G16H 30/40 |
| 2021/0192126 A1* | 6/2021 | Gehrmann | | G06N 20/00 |
| 2021/0258601 A1* | 8/2021 | Kim | | H04N 19/159 |
| 2021/0294781 A1* | 9/2021 | Fernández | | G10L 15/197 |
| 2022/0058448 A1* | 2/2022 | Abad Peiro | | G06V 10/764 |

\* cited by examiner

METHOD, ELECTRONIC DEVICE, AND COMPUTER PROGRAM PRODUCT FOR DATA INDEXING

CROSS-REFERENCE TO RELATED APPLICATION

This patent application claims priority, under 35 U.S.C. § 119, of Chinese Patent Application No. 202010479672.0, filed May 29, 2020, which is incorporated by reference in its entirety.

TECHNICAL FIELD

Embodiments of the present disclosure generally relate to storage systems, and more particularly, to a method, an electronic device, and a computer program product for data indexing.

BACKGROUND

In storage systems, such as file systems and backup systems, files and data are divided into fixed-length or variable-length data blocks for storage. In order to support fast random access and data deduplication, indexes corresponding to data blocks are usually constructed, and a desired data block is found and located from a large number of stored data blocks through indexing. The construction of indexing will affect the efficiency of data search and access and the applicability to different application scenarios.

SUMMARY OF THE INVENTION

The embodiments of the present disclosure relate to an improved solution for data indexing.

In a first aspect of the present disclosure, a method for data indexing is provided. The method includes obtaining a plurality of data blocks for storage. The method further includes generating a plurality of vectorized representations of the plurality of data blocks so that a difference between vectorized representations of data blocks with a higher similarity among the plurality of data blocks is smaller. The method further includes storing the plurality of vectorized representations for indexing the plurality of data blocks respectively.

In a second aspect of the present disclosure, an electronic device is provided. The electronic device includes: at least one processor; and at least one memory storing computer program instructions, the at least one memory and the computer program instructions being configured to cause, with the at least one processor, the electronic device to perform actions. The actions include: obtaining a plurality of data blocks for storage; generating a plurality of vectorized representations of the plurality of data blocks so that a difference between vectorized representations of data blocks with a higher similarity among the plurality of data blocks is smaller; and storing the plurality of vectorized representations for indexing the plurality of data blocks respectively.

In a third aspect of the present disclosure, a computer program product is provided. The computer program product is tangibly stored on a non-volatile computer-readable medium and includes computer-executable instructions. The computer-executable instructions, when executed, cause a device to perform actions. The actions include: obtaining a plurality of data blocks for storage; generating a plurality of vectorized representations of the plurality of data blocks so that a difference between vectorized representations of data blocks with a higher similarity among the plurality of data blocks is smaller; and storing the plurality of vectorized representations for indexing the plurality of data blocks respectively.

It should be understood that the content described in the summary part is neither intended to limit key or essential features of the embodiments of the present disclosure, nor intended to limit the scope of the present disclosure. Other features of the present disclosure will become readily understandable through the following description.

BRIEF DESCRIPTION OF THE DRAWINGS

The above and other objects, features, and advantages of the embodiments of the present disclosure will become readily understandable by reading the following detailed description with reference to the accompanying drawings. In the accompanying drawings, several embodiments of the present disclosure are shown by way of example and not limitation, where.

Throughout the accompanying drawings, the same or similar reference numerals are used to indicate the same or similar components.

DETAILED DESCRIPTION

The principles and spirits of the present disclosure will be described below with reference to some example embodiments shown in the accompanying drawings. It should be understood that these specific embodiments are described only for the purpose of enabling a person skilled in the art to better understand and then implement the present disclosure, instead of limiting the scope of the present disclosure in any way.

The term "include" and its variants as used herein indicate open-ended inclusion, i.e., "including, but not limited to." Unless specifically stated, the term "or" indicates "and/or." The term "based on" means "based at least in part on." The terms "one example implementation" and "one implementation" mean "at least one example implementation." The term "another implementation" means "at least one further implementation." The terms "first," "second," and the like may refer to different or identical objects. Other explicit and implicit definitions may also be included below.

As used herein, the term "model" may learn a correlation or functional relationship between corresponding inputs and outputs from training data, so that after training is completed, such a correlation or functional relationship may be utilized to generate a corresponding output for a given input. Model generation may be based on a machine learning technology. Deep learning is a machine learning algorithm that uses multiple layers of processing units to process inputs and provide corresponding outputs. A neural network model is an example of a deep learning-based model. Herein, "model" may also be referred to as "machine learning model," "learning model," "machine learning network," or "learning network," and these terms are used interchangeably herein.

Machine learning generally includes at least two phases, namely, a training phase and a use phase (also called an inference phase). In the training phase, a given model may be trained using a large amount of training data, and iteration is continuously made until the model can obtain, from the training data, consistent inferences similar to inferences that can be made by human intelligence. Through training, the model may be considered as being able to learn a correlation between inputs and outputs (also called a functional relationship between inputs and outputs) from the training data. Parameter values of the trained model are determined. That is, the model may be represented as a function for mapping inputs into outputs. In the use phase, the model may be used to process an actual input based on the parameter values obtained by training and determine a corresponding output.

Figure 1:
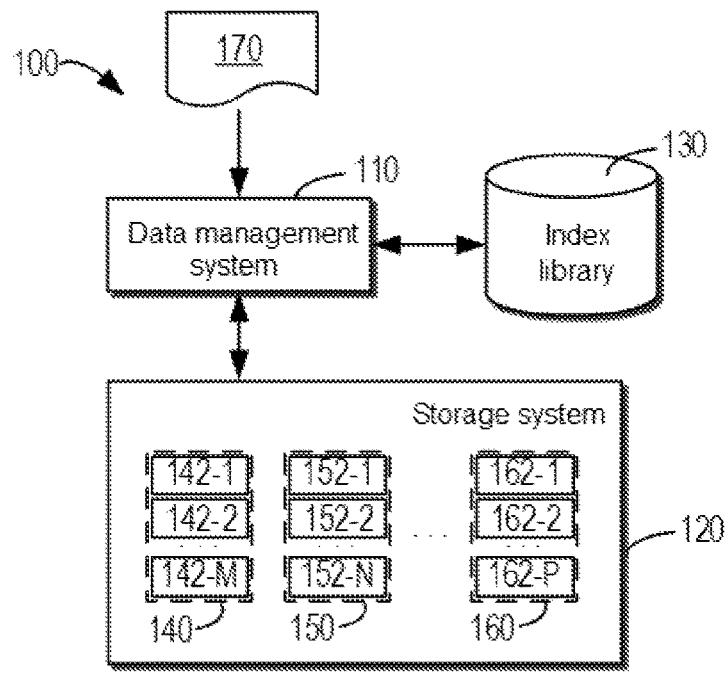
FIG. 1 illustrates a block diagram of an example environment where the embodiments of the present disclosure may be implemented.

FIG. 1 illustrates a schematic diagram of example environment 100 in which the embodiments of the present disclosure may be implemented. In the example of FIG. 1, data management system 110 is configured to control and manage storage system 120, including: storing data to storage system 120, providing access to the data, and other data management operations. Data management system 110 may be implemented on various computing devices/servers. Storage system 120 may include various storage devices for providing a data storage space. Various storage devices may be integrated at one site or distributed in different locations.

Data management system 110 may control and manage storage system 120 based on various storage technologies. Generally, data management system 110 divides data to be stored (such as various files and data entries) into fixed-length or variable-length data blocks for storage. For example, as shown in the figure, file 140 is divided into data blocks 142-1, 142-2, . . . , 140-M, which are stored in storage system 120, file 150 is divided into data blocks 152-1, 152-2, . . . , 150-N, which are stored in storage system 120, and file 160 is divided into data blocks 162-1, 162-2, . . . , 160-P, which are stored in storage system 120. It is to be noted that although shown collectively in the figure, data blocks of each file may be distributed in any storage location of storage system 120.

In order to support fast random access to and deduplication of stored data, data management system 110 will also construct an index corresponding to each data block, and store the indexes of the data blocks in index library 130 to support subsequent access to the data blocks.

Figure 2:
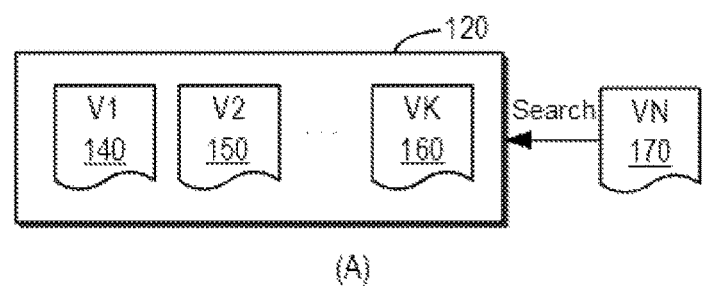
FIG. 2 illustrates an example of data search in the environment of FIG. 1.
Figure 2:
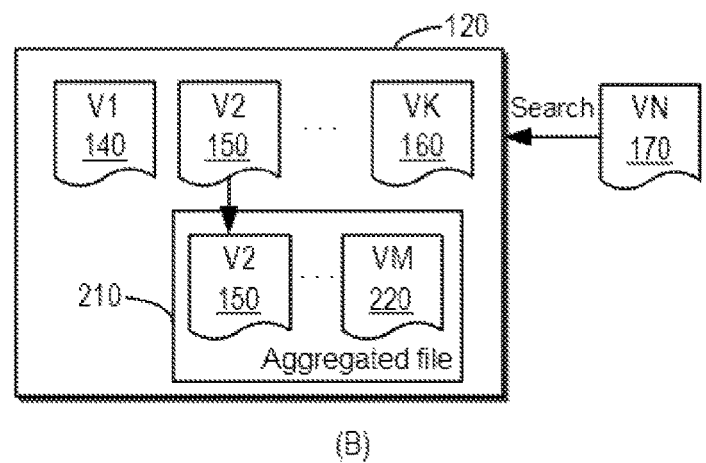

Since data is one of important assets in many activities or for many organizations, in some cases, it may be required to back up data into storage system 120 multiple times on a periodic or event-triggered basis (such as data update). Different versions of the same data are formed to achieve the purpose of data protection. In this case, storage system 120 may include a main storage system and one or more backup storage systems. In some data access applications, it may be desirable to access the same or similar data in storage system 120. This may be implemented, for example, by providing search data 170 to data management system 110. FIG. 2 illustrates two examples of data search.

In an example (A) of FIG. 2, it is assumed that files 140, 150, . . . , 160 stored in storage system 120 are different versions of the same file, for example, versions V1, V2, to VK. Data in different versions may vary slightly. For example, it is assumed that these files are used to store personal information of an account number. File 140 of version V1 may store initial personal information, such as a user name, a phone number, and a contact address. File 150 of version V2 may be newly added with an area code of the phone number compared with file 140. The contact address may be updated in file 160 of version VK.

In some cases, if the account number is deleted or for other reasons, it may be desirable to delete the personal information backed up multiple times from storage system 120. This is more common in storage systems of some companies/commercial organizations, mainly to meet the requirements for user privacy protection. For example, the European Union's General Data Protection Regulation (GDPR) requires a website to provide an option for deleting personal information. In order to delete different versions of the same file, data management system 110 may search, based on a current version of the file or other available versions VN such as file 170, storage system 120 for data matching file 170, so as to perform deletion.

In an example (B) of FIG. 2, for the same file, in addition to being stored separately, a certain file may also be aggregated into a larger file and stored in storage system 120. For example, file 150 of version V2 may be merged with another file 220 of version VM in aggregated file 210. Therefore, when searching and deleting data, it is also required to use file 170 to find matching file 150 from aggregated file 210.

Of course, FIG. 2 only shows some example scenarios that may occur during data access. In other scenarios, there may also be data access, search, and other operations in other forms.

It should be understood that FIG. 1 only schematically illustrates environment 100 without imposing any limitation to the embodiments of the present disclosure. The various systems/devices in environment 100 may be arranged in any other manner. For example, although shown as being separated from storage system 120, index library 130 may also be integrated in storage system 120, and storage system 120 provides a storage space for indexing data blocks.

In conventional storage systems, a hash function is usually used to calculate a hash value of a data block to construct an index of the data block. Such an index is also called a hash index. Hash values of data blocks may be organized, for example, in a Merkle tree structure, which calculates hash values upward layer by layer from direct hash values of data blocks until a single hash value is obtained as a root node.

A hierarchical hash composed of hash values may achieve a very efficient and exact matching-based data search. However, an important attribute of hash functions is that small changes in data blocks (for example, even small changes in several bits) will result in completely different hash values. Such an attribute helps to distribute all data blocks to all available space of a storage system, thereby preventing reversely deriving an original data block from a hash value. However, in applications that require partial matching to implement a fuzzy search, such as duplicate data deletion, data search, etc. in a storage system, hash value-based indexing will be difficult to achieve.

For example, if a file of a certain version is used to search all versions stored in the storage system, only some files of the latest versions may be obtained through hash values of data blocks of all files. Or, when a file is divided into a plurality of data blocks, because modifications in the file are relatively concentrated, it may be possible to find completely unmodified data blocks through hash value matching, thereby locating similar files. However, this process needs to be lucky enough, and if modifications in the file are scattered, similar files cannot be found, so it is not suitable for practical applications. In addition, this process usually results in relatively high computational complexity and time overhead.

In theory, search may be performed by directly using original data, such as data blocks of original files, instead of hash indexing. For example, for a given search data block, by calculating a similarity between a byte sequence of the given search data block and a byte sequence of a stored data block, it may be determined whether the two data blocks are similar. However, this process is obviously very inefficient. In practical applications, it is also difficult to find similar data blocks by polling all data blocks in a storage system.

Another solution to perform fuzzy matching is to use local sensitive hashing (LSH). However, LSH has limitations because LSH only gives a rough result in a given "bucket" (for example, a given data block set), that is, only a rough estimation can be achieved for similar content. LSH cannot give a measure of a similarity between any two input data blocks. The result of LSH is also on the basis of probability, so there is no guarantee that all similar data blocks can be found in one call.

Considering the deficiency of current hash indexing, the need to perform a fuzzy search in a storage system, and many other reasons, it is desirable to provide an improved data indexing solution.

According to an example embodiment of the present disclosure, a solution for data indexing is proposed. According to this solution, a vectorized representation of a data block is generated for indexing the corresponding data block. The generated vectorized representations can be used to distinguish similarities between different data blocks. Therefore, among a plurality of data blocks, a difference between vectorized representations of data blocks with a higher similarity is smaller, and a difference between vectorized representations of data blocks with a lower similarity is greater. In some embodiments, a neural network-based representation generation model may be utilized to generate vectorized representations of data blocks.

The vectorized representations serve as indexes of the data blocks, and the vectorized representations may be used to effectively measure similarities between the data blocks, thereby providing the possibility of performing a fuzzy search of the data blocks based on the similarities. In addition, vectorized representation-based indexing is also compatible with current hash value-based indexing, and the two jointly support more data access and search applications for data in a storage system.

The embodiments of the present disclosure will be described in more detail below with reference to the accompanying drawings.

FIG. 2 illustrates a block diagram of a data management system according to some embodiments of the present disclosure. For ease of explanation, a data management system according to some embodiments of the present disclosure is described with reference to environment 100 of FIG. 1 and represented as data management system 110. In the example of FIG. 2, data management system 110 is configured to generate corresponding indexes for data already stored or to be stored in storage system 120, for example, data 302, to facilitate subsequent search for and access to data blocks.

Specifically, data management system 110 includes data slicing module 310 configured to divide data 302 into a plurality of data blocks, such as data blocks 304-1, 304-2, ..., 304-K (where K is an integer greater than 1). For ease of discussion, data blocks 304-1, 304-2, ..., 304-K are sometimes referred to, collectively or individually, as data block 304 herein.

Data 302 may include one or more pieces of data in the form of files, data entries, and the like. The data type may be, for example, various electronic documents, images, audios, videos, and the like. The embodiments of the present disclosure do not limit types of the data that may be stored and indexed.

Data slicing module 310 may be configured to divide a byte sequence of data 302 by a fixed length or by a variable length. That is, a plurality of data blocks 304 may have the same size or have different sizes. In some embodiments, when constructing indexes proposed according to an embodiment of the present disclosure, data 302 may have been divided into corresponding data blocks 304 and stored in storage system 120. In some embodiments, data 302 may be new data provided to data management system 110.

Data management system 110 further includes representation generation module 320 configured to generate respective vectorized representations 322-1, 322-2, ..., 322-K of the plurality of data blocks 304-1, 304-2, ..., 304-K. For ease of discussion, vectorized representations 322-1, 322-2, ..., 322-K are sometimes referred to, collectively or individually, as vectorized representation 322 herein. The vectorized representation of a data block may be considered as a short representation of the data block, which may usually be represented by a numerical vector of a certain dimension. The vectorized representation of a data block is sometimes also referred to as a feature representation, feature vector, or insertion vector of the data block.

According to an embodiment of the present disclosure, representation generation module 320 is configured to be able to generate a vectorized representation in such a way that a difference between vectorized representations of data blocks with a higher similarity is smaller (or a similarity between the vectorized representations is higher), and a difference between vectorized representations of data blocks with a lower similarity is greater (or a similarity between the vectorized representations is lower). Here, the similarity or difference between data blocks refers to the similarity or difference between content of the data blocks. That is, a difference between vectorized representations of two data blocks may be equal to or close to a difference between these two data blocks (for example, a difference between original byte sequences of the data blocks). Thus, a similarity between different data blocks may be measured by a difference between vectorized representations.

Vectorized representations 322 of different data blocks 304 may be represented as numerical vectors of the same number of dimensions, so that different vectorized representations 322 are comparable so as to support determining a difference between vectorized representations 322 by calculating a distance between vectors. The difference between vectorized representations 322 may be, for example, determined by any method of measuring a distance between vectors, for example, determined based on a Euclidean distance (that is, L2 distance), a cosine distance, and the like. The embodiments of the present disclosure do not impose limitations to this.

In some embodiments, in order to make the measurement of similarities between data blocks based on vectorized representations advantageous, when vectorized representations 322 and data blocks 304 are represented in the same data representation manner such as binary or decimal, the number of dimensions of vectorized representations 322 is smaller than the number of dimensions of data blocks 304. In some embodiments, if data blocks 304 have a variable size, representation generation module 320 is configured to be able to map variable-size inputs (that is, "data blocks") into outputs of the same number of dimensions (that is, "vectorized representations"). Of course, the embodiments of the present disclosure do not impose limitations to specific numbers of dimensions of vectorized representations 322. The selection of a specific number of dimensions may depend on practical applications.

As an example, it is assumed that the number of dimensions of vectorized representation 322 is 3. For certain data block 304 and very similar data block 304, vectorized representation 322 determined by representation generation module 320 for two data blocks 304 may be [1.0, 1.0, 1.0] and [1.1, 1.0, 0.9], respectively. A similarity between two vectorized representations 322 may reach 90%, indicating that a similarity between corresponding data blocks 304 is high. For the same data block 304 with vectorized representation [1.0, 1.0, 1.0], vectorized representation 322 determined by representation generation module 320 for dissimilar data block 304 may be [0.5, 0.3, 2.1]. A similarity between two vectorized representations 322 is 20%, indicating that a similarity between corresponding two data blocks 304 is low. It should be understood that the specific number of dimensions and vector values given here are for illustrative purposes only, and do not impose any limitation to the embodiments of the present disclosure.

In some embodiments, representation generation module 320 may be configured to implement generation of vectorized representation 322 of data block 304 using a deep learning technology. For example, representation generation module 320 may be configured to generate vectorized representation 322 of data block 304 using a neural network-based model (also referred to as a representation generation model). The representation generation model that may be used by representation generation module 320 has been trained by training data. An example training process of the representation generation model will be described below.

The representation generation model may receive data block 304 (having a fixed size or variable size) as a model input, and generate corresponding vectorized representation 322 as a model output by processing the model input. The representation generation model may be configured as a neural network model in any form. The representation generation model may be, for example, a recurrent neural network (RNN) model, a convolutional neural network (CNN), any deformed models thereof, or other types of models. Inputs to the representation generation model may be, for example, an original byte sequence of data block 304, and such an original byte sequence will usually be stored in storage system 120.

In addition to a neural network-based model, representation generation module 320 may also use any other technology capable of generating a vectorized representation of data, which is not limited in the embodiments of the present disclosure.

Vectorized representation 322 generated via representation generation module 320 is provided to storage execution module 330 in data management system 110. Storage execution module 330 is configured to store respective vectorized representations 322 of a plurality of data blocks 304 into index library 130 for respectively indexing the plurality of data blocks 304 stored in storage system 120. In some embodiments, if data block 304 is a data block of new data, storage execution module 330 may be further configured to store data block 304 into storage system 120.

By establishing indexes, corresponding data block 304 stored in storage system 120 may be found via vectorized representation 322. Since different vectorized representations 322 may be used to measure similarities between different data blocks, such vectorized representations 322 may also be referred to as "similarity indexes" of data blocks 304.

In practical applications, as new data is written to storage system 120, data management system 110 may continuously generate corresponding vectorized representations for one or more data blocks of the new data as similarity indexes. Data management system 110 may also establish vectorized representations 322 for existing data blocks in storage system 120 as similarity indexes.

Figure 5:
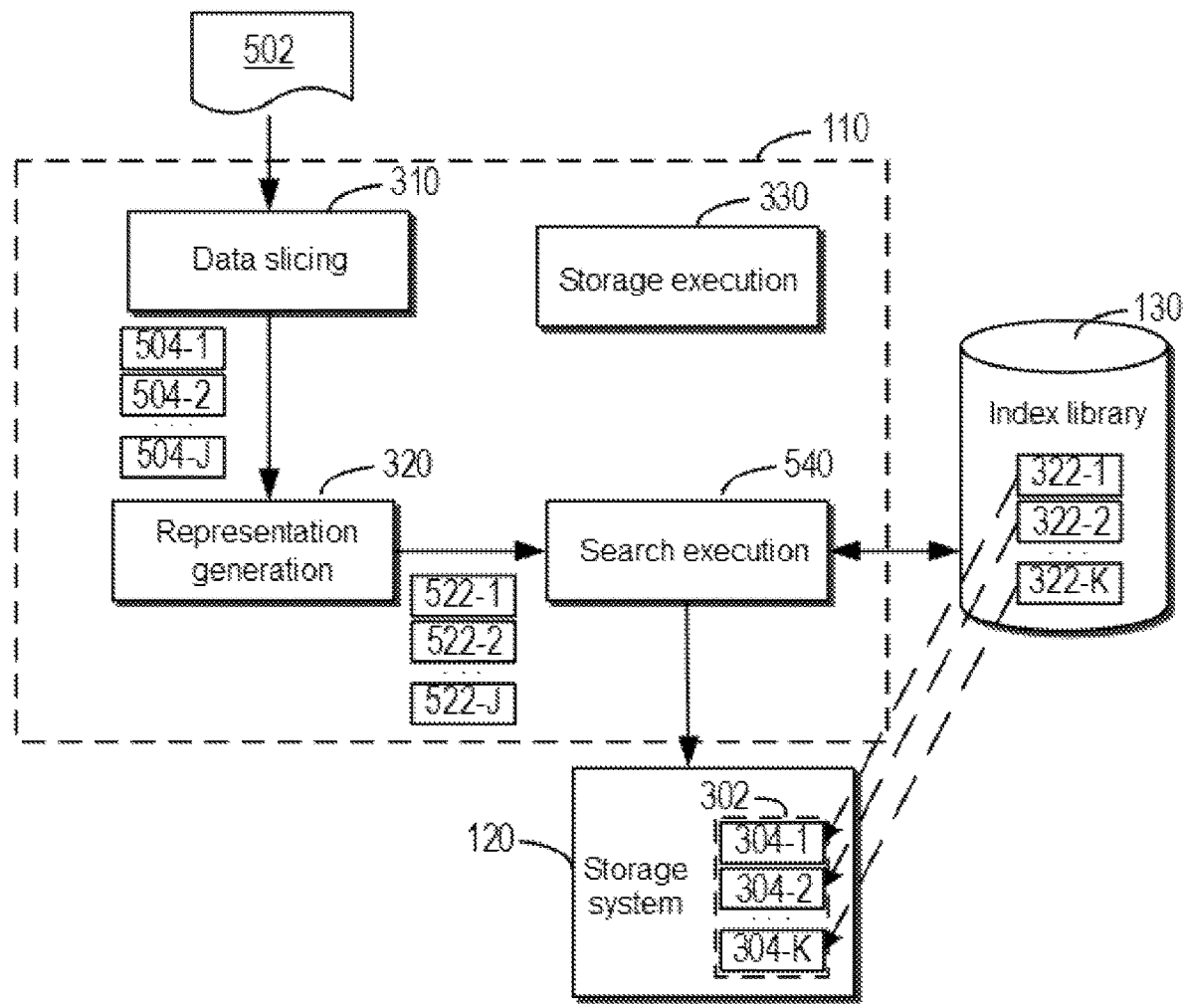
FIG. 5 illustrates a block diagram of a data management system according to some other embodiments of the present disclosure.

The similarity indexes served by vectorized representations 322 may help to quickly and accurately locate similar data blocks from storage system 120, which will be described in detail below with reference to FIG. 5. Before that, how to train a representation generation module to generate vectorized representations of data blocks is first described.

Figure 4:
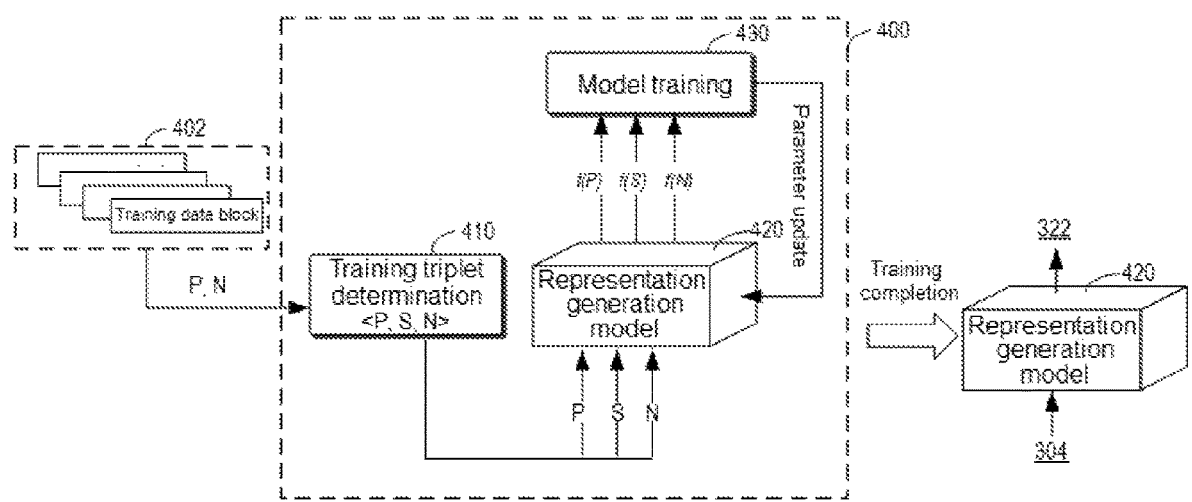
FIG. 4 illustrates a block diagram of a system for training a representation generation model according to some embodiments of the present disclosure.

FIG. 4 illustrates a schematic diagram of model training system 400 of representation generation model 420 according to some embodiments of the present disclosure. Trained representation generation model 420 may be provided to representation generation module 320 of data management system 110 for use. Model training system 400 may be implemented independently of data management system 110. That is to say, training and use of the representation generation model may be completed by different systems. For example, model training system 400 may be implemented on another computing device or server. In other embodiments, the training of representation generation model 420 may also be integrated into data management system 110. For example, the function of model training system 400 may be implemented by data management system 110.

Due to the above-mentioned requirements for vectorized representations of data blocks, the training target of representation generation model 420 is to make a difference between vectorized representations generated for similar data blocks smaller and a difference between vectorized representations generated for dissimilar data blocks greater. In the example embodiment of FIG. 4, representation generation model 420 is trained based on a triplet loss training technology.

Specifically, model training system 400 includes training triplet determination module 410, which is configured to construct training samples for training representation generation model 420. Each training sample includes three training data blocks, namely, a first training data block (represented as "P"), a second training data block (represented as "S") similar to the first training data block, and a third training data block (represented as "N") dissimilar to the first training data block.

That is, first training data block P and second training data block S constitute a pair of similar data blocks, and first training data block P and third training data block S constitute a pair of dissimilar data blocks. The similarity or dissimilarity between data blocks may be distinguished by setting a similarity threshold. If a similarity between original byte sequences of two data blocks is greater than or equal to the similarity threshold, the two data blocks may be considered to be similar; otherwise, the two data blocks may be considered to be dissimilar. The similarity threshold may be, for example, set to 50% or any other suitable value.

In some embodiments, training triplet determination module 410 may select first training data block P and third training data block N from data block set 402. Data block set 402 may include a plurality of training data blocks obtained from data sources such as various corpora. Training triplet determination module 410 may randomly select first training data block P and third training data block N from data block set 402. Since the training data blocks in data block set 402 may generally be different, such a random selection may ensure, to some extent, that first training data block P and third training data block N are dissimilar. Of course, training triplet determination module 410 may also specifically calculate the similarity between the selected training data blocks to ensure that the difference between the determined first training data block P and third training data block N is higher.

In some embodiments, training triplet determination module 410 may generate second training data block S by modifying a part of first training data block P. Such modification may be to randomly modify any part of first training data block P. The amount of modification to first training data block P can be controlled to ensure that second training data block S and first training data block P have certain differences and relatively similar parts. By modifying first training data block P to obtain second training data block S, second training data block S similar to first training data block P may be obtained more quickly. Of course, training triplet determination module 410 may also determine second training data block S similar to first training data block P through search data block set 402.

The training triplet is constructed so that the training target of representation generation model 420 may be described as: enabling a difference between vectorized representations generated by trained representation generation model 420 for first training data block P and second training data block S to be less than a difference between vectorized representations generated for first training data block P and third training data block N.

In some embodiments, the model training process may be guided based on triplet loss to meet the above training target. The triplet loss may be represented as a loss function based on the following differences: a difference between the vectorized representation f(P) of first training data block P and that of second training data block S f(S) and a difference between the vectorized representation f(P) of first training data block P and that of third training data block N f(N). Representation generation model 420 may respectively determine the vectorized representation of each training data block based on current parameter values.

In an example, the triplet loss (represented as £(P, S, N)) may be determined:

$$£(P,S,N)=\max(\text{dist}(f(P),f(S))-\text{dist}(f(P),f(N))+\alpha,0) \quad \text{(Formula 1)}$$

In the above formula (1), dist (X, Y) represents the difference or similarity between two vectorized representations X and Y. Since the vectorized representation may be understood as a multi-dimensional numerical vector, the similarity or difference between two vectorized representations may be determined using any method suitable for measuring a difference between vectors, such as a Euclidean distance or a cosine distance. In one example, if a difference between two vectorized representations is determined based on a Euclidean distance, a larger distance means a greater difference and a smaller similarity between the two vectorized representations.

In formula (1), $\alpha$ represents a minimum interval between a difference between vectorized representations of first training data block P and second training data block S and a difference between vectorized representations of first training data block P and third training data block N. $\alpha$ is a hyperparameter of the model, which may be configured to a predetermined value based on experience or other possible ways.

If the training target is based on the triplet loss, it can be seen from formula (1) that, if a difference between f(P) and f(S) is greater than or equal to the sum of a difference and an interval $\alpha$ between f(P) and f(N), the triplet loss £(P, S, N) is greater than zero, which means that there is still loss in the current round of training. If a difference between f(P) and f(S) is less than the sum of a difference and an interval $\alpha$ between f(P) and f(N), the triplet loss £(P, S, N) has a value of zero.

During the training process, model training module 430 in model training system 400 determines a parameter update for representation generation model 420 based on a loss value. Model training module 430 may determine a parameter value update for the model based on various appropriate model training methods, such as the stochastic gradient descent method and its various variant algorithms. In order to achieve the training target, model training module 430 may need to iteratively train representation generation model 420 based on a plurality of training triplets, so that the triplet loss becomes smaller and smaller in multiple iterations until convergence is reached. Each training triplet used in the training process may be determined according to the embodiments discussed above. The convergence condition for model training may be, for example, that the triplet loss is minimum, for example, equal to zero or equal to other acceptable values.

It should be understood that the triplet loss described above is still only an example. In the training method that uses training triplets for model training, other loss functions may also be constructed to achieve the training target. In addition to using training triplets for model training, other modes may also be used to train representation generation model 420. The embodiments of the present disclosure are not limited in this respect. After training is completed, parameter values of representation generation model 420 are determined. Representation generation model 420 may be provided to generate vectorized representations of data blocks.

Figure 3:
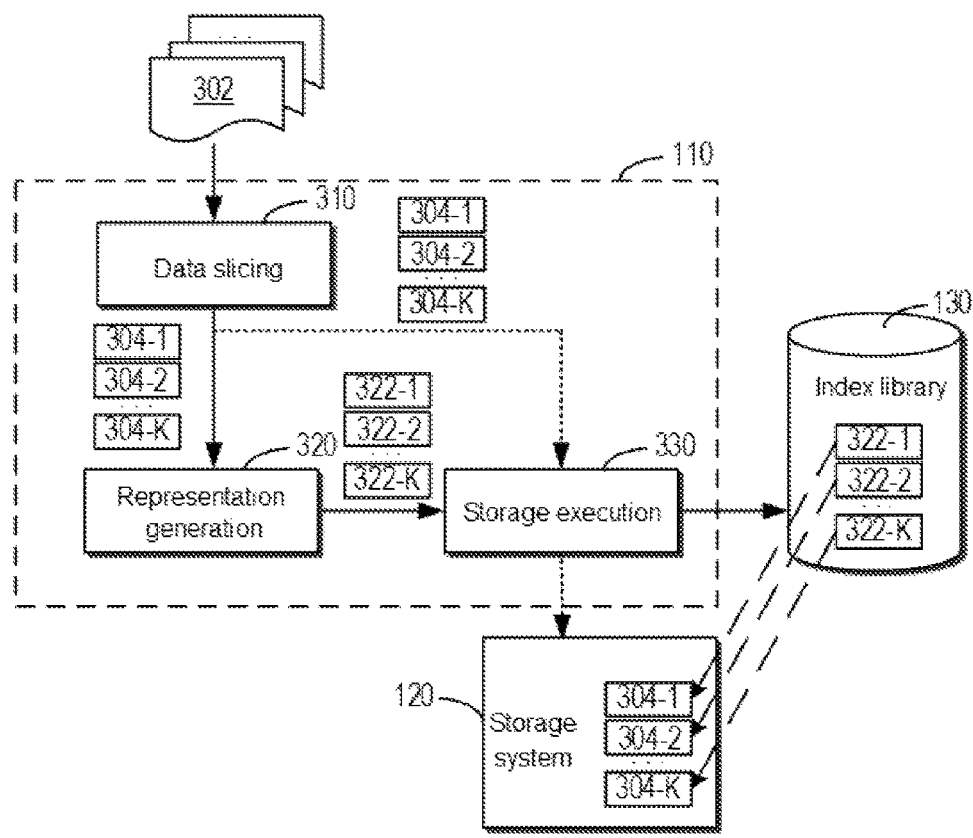
FIG. 3 illustrates a block diagram of a data management system according to some embodiments of the present disclosure.

How to use similarity indexes served by vectorized representations 322 to quickly and accurately locate similar data blocks from storage system 120 will be discussed hereinafter. FIG. 5 shows such an example embodiment for performing data block search. Compared with FIG. 3, data management system 110 in FIG. 5 further includes search execution module 540 for implementing data block search based on vectorized representations.

Specifically, data management system 110 may perform data block search in response to a search. Data management system 110 may obtain a search for data 502. Data 502 may be a file or data in another form. Data 502 may be new data or data designated by a user and stored in storage system 120. In some embodiments, data slicing module 310 may perform slicing of data 502, for example, slicing according to a variable length or a non-variable length. The specific slicing method is the same as the previous slicing manner for data 302 for storage. Data 502 may be divided into one or more data blocks 504-1, 504-2, . . . , 504-J (for ease of discussion, collectively or individually referred to as data block 504), where J may be an integer greater than or equal to 1. Such data block 504 may also be referred to as search data block 504.

Representation generation module 320 of data management system 110 is configured to generate a vectorized representation of search data block 504 (referred to as "search vectorized representation"), such as search vectorized representations 522-1, 522-2, . . . , 522-J, which are collectively or individually referred to as search vectorized representation 522. The generation of search vectorized representation 522 of search data block 504 is similar to that of vectorized representation 322 of data block 304. For example, representation generation module 320 may use trained representation generation model 420 to generate search vectorized representation 522 of each search data block 504.

Search vectorized representation 522 is provided to search execution module 540 for performing searching for similar data blocks. Specifically, for search vectorized representation 522 of each data block 504, search execution module 540 is configured to search a plurality of vectorized representations 322 stored in index library 130 for at least one vectorized representation 322 with a difference between the at least one vectorized representation 322 and search vectorized representation 522 that is less than a difference threshold. Here, a specific difference threshold may be set according to actual needs.

With the aid of vectorized representations of data blocks (that is, similarity indexes), a search for similar data blocks may be converted to a search for similar vectorized representations. The search for similar vectorized representations may be considered as a problem of searching for one or more nearest neighbors in a vector space. This may be achieved in many ways. A simple and direct way is to poll the plurality of vectorized representations 304 stored in index library 130. Compared with directly calculating a similarity between search data block 504 and stored data block 304, the calculation amount required to calculate a similarity between vectorized representations will be lower because the number of dimensions of the vectorized representations is smaller.

In some embodiments, in order to improve the efficiency of searching the plurality of vectorized representations 304 for a similar vectorized representation of search vectorized representation 504, when storing vectorized representation 322, storage execution module 330 may determine a data structure suitable for a neighbor search to store vectorized representation 322. An example data structure is a K-dimensional tree (KD) tree data structure. Such a data result may reduce the search time from O(n) spent for searching based on a direct comparison to O(long(n)), where n is the number of vectorized representations, in index library 130, to be compared with search vectorized representation 522.

Figure 6:
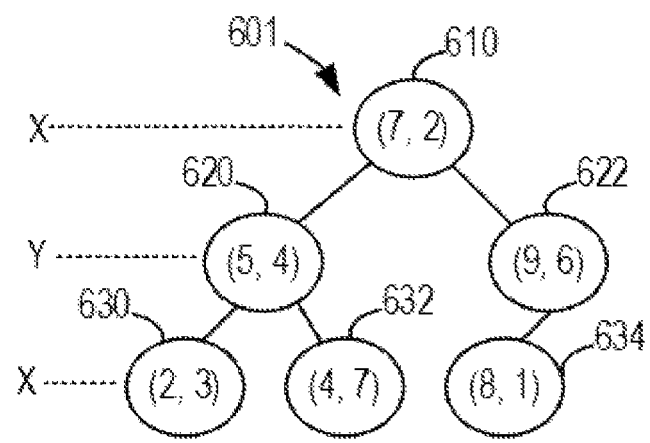
FIG. 6 illustrates a schematic diagram of a data structure for index storage according to some embodiments of the present disclosure.
Figure 6:
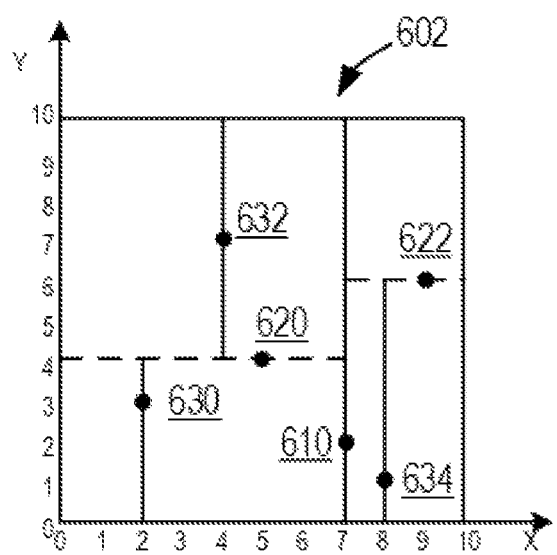

FIG. 6 shows a schematic representation of a KD tree data structure. As shown in FIG. 6, the KD tree data structure may sort and organize a plurality of vectorized representations 610, 620, 622, 630, 632, and 634 into tree structure 601. These vectorized representations may also be mapped into two-dimensional space coordinates 602. It is to be noted that, for the convenience of illustration, a simple two-dimensional numerical vector is used in FIG. 6 to represent a vectorized representation. This example does not limit the scope of the embodiments of the present disclosure.

If vectorized representation 322 in index library 130 is also stored according to the KD tree data structure, when searching for a vectorized representation similar to search vectorized representation 522, search execution module 540 may start from a root node of the tree structure to recursively downward search for vectorized representation 322 that is less different from search vectorized representation 522. Those skilled in the art are clear about how to find similar vectorized representations based on the KD data structure, so that detailed description is not given here.

Of course, in addition to the KD tree structure, vectorized representation 322 may also be stored in accordance with other data structures suitable for a neighbor search, and the embodiments of the present disclosure are not limited thereto.

After search execution module 540 finds one or more vectorized representations 322 less different (for example, the difference is less than a difference threshold) from search vectorized representation 522 from index library 130, data blocks 304 respectively indexed by vectorized representations 322 may be determined based on these vectorized representations. The determined one or more data blocks 304 may be used as a response to a current search or as a candidate for the response (for example, may be further filtered based on other criteria). For each search data block 504, similar data blocks 304 in storage system 120 may be similarly determined. By means of similarity indexes served by vectorized representations, search execution module 540 may effectively and comprehensively locate similar data blocks in storage system 130.

The data indexing of an example embodiment of the present disclosure is mentioned above. Such similarity indexing may be compatible with other indexing, such as hash indexing used for accurate matching of data blocks, and jointly used to provide access to and search for data blocks in storage system 120.

It should be understood that the "module" used herein may be implemented by software, hardware, firmware, or any combination thereof. One or more modules may be implemented on a single computing device, on a plurality of computing devices, or in a cloud computing environment. The embodiments of the present disclosure are not limited in this respect.

Figure 7:
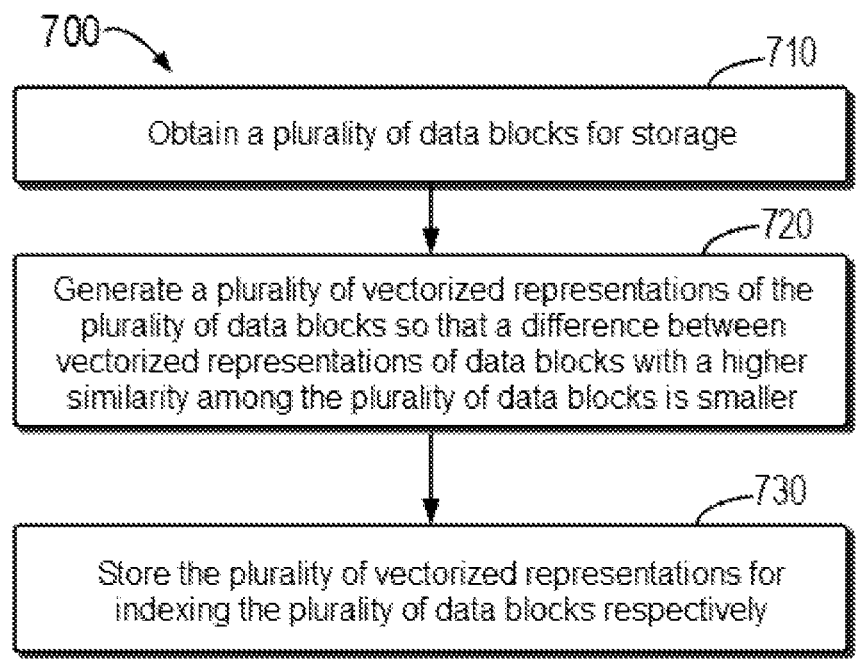
FIG. 7 shows a flowchart of a process for data indexing according to some embodiments of the present disclosure.

FIG. 7 shows a flowchart of process 700 for data indexing according to some embodiments of the present disclosure. Process 700 may be implemented at data management system 110 of FIG. 2. For ease of discussion, process 700 is described from the perspective of data management system 110.

At block 710, data management system 110 obtains a plurality of data blocks for storage. At block 720, data management system 110 generates a plurality of vectorized representations of the plurality of data blocks so that a difference between vectorized representations of data blocks with a higher similarity among the plurality of data blocks is smaller. At block 730, data management system 110 stores the plurality of vectorized representations for indexing the plurality of data blocks respectively.

In some embodiments, the plurality of vectorized representations are represented by numerical vectors of the same number of dimensions.

In some embodiments, when generating a plurality of vectorized representations of a plurality of data blocks, data management system 110 may utilize a trained representation generation model to generate the plurality of vectorized representations of the plurality of data blocks. Such a representation generation model is a neural network model.

In some embodiments, the representation generation model is trained based on a training triplet, the training triplet including a first training data block, a second training data block similar to the first training data block, and a third training data block dissimilar to the first training data block. In some embodiments, a training target of the representation generation model is to make a difference between vectorized representations generated by the representation generation model for the first training data block and the second training data block less than a difference between vectorized representations generated for the first training data block and the third training data block.

In some embodiments, the first training data block and the third training data block are selected from a data block set, and the second training data block is generated by modifying a part of the first training data block.

In some embodiments, when storing the plurality of vectorized representations, data management system 110 may determine a data structure suitable for a neighbor search, and store the plurality of vectorized representations according to the selected data structure.

In some embodiments, the stored vectorized representations may be used to support searching for similar data blocks. Specifically, data management system 110 may obtain a search associated with a search data block. Data management system 110 may generate a search vectorized representation of the search data block, and search a plurality of stored vectorized representations for at least one vectorized representation with a difference between the at least one vectorized representation and the search vectorized representation that is less than a difference threshold. Then, data management system 110 may determine a response to the search based on at least one data block, indexed by the at least one vectorized representation, among the plurality of data blocks.

In some embodiments, when generating a search vectorized representation of a search data block, data management system 110 may use a trained representation generation model to generate the search vectorized representation of the search data block. The representation generation model used here is also used to generate a plurality of vectorized representations of a plurality of data blocks.

Figure 8:
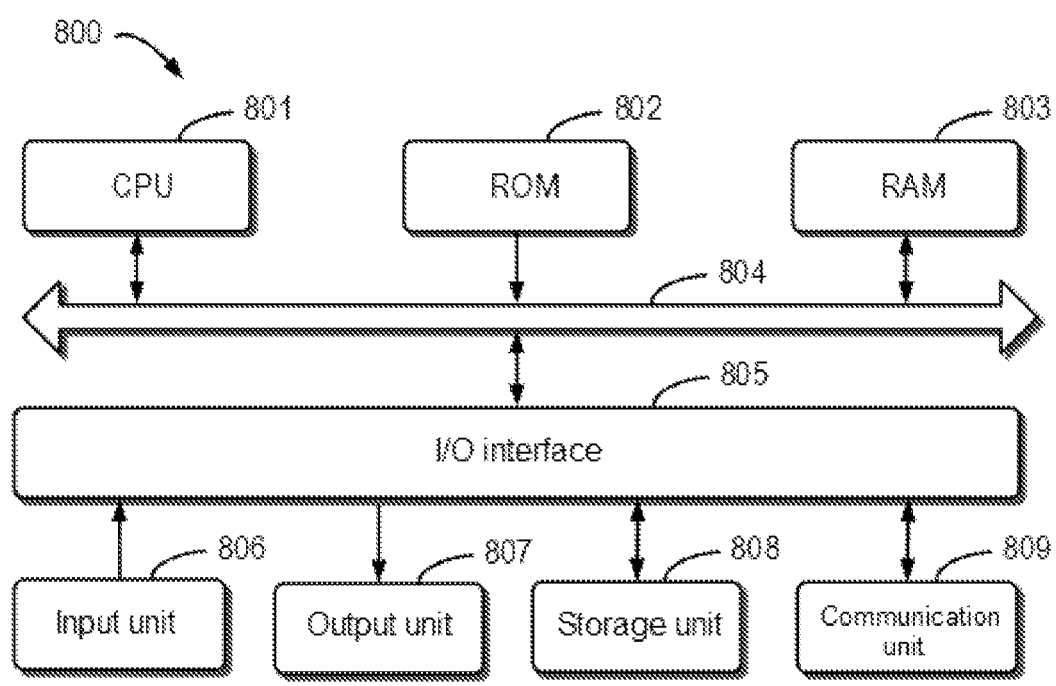
FIG. 8 illustrates a schematic block diagram of a device that may be configured to implement the embodiments of the present disclosure.

FIG. 8 schematically illustrates a block diagram of device 800 that can be configured to implement the embodiments of the present disclosure. It should be understood that device 800 shown in FIG. 8 is merely an example and should not constitute any limitation to the function and scope of the embodiments described herein. Device 800 shown in FIG. 8 may be configured to implement process 700 of FIG. 7. Device 800 shown in FIG. 8 may be implemented as or included in data management system 110 of FIG. 2.

As shown in FIG. 8, device 800 includes central processing unit (CPU) 801 which may execute various appropriate actions and processing in accordance with computer program instructions stored in read-only memory (ROM) 802 or computer program instructions loaded onto random access memory (RAM) 803 from storage unit 808. In RAM 803, various programs and data required for the operation of device 800 may also be stored. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

The various processes and processing described above, such as process 700, may be performed by processing unit 801. For example, in some embodiments, process 700 may be implemented as a computer software program that is tangibly included in a machine-readable medium, for example, storage unit 808. In some embodiments, some or all of the computer program may be loaded into and/or installed onto device 800 via ROM 802 and/or communication unit 809. When the computer program is loaded onto RAM 803 and executed by CPU 801, one or more steps of process 700 described above may be performed.

The embodiments of the present disclosure may further provide a computer-readable storage medium having computer-executable instructions stored thereon. The computer-executable instructions are executed by a processor to implement the method described above. According to an example implementation of the present disclosure, a computer program product is further provided. The computer program product is tangibly stored on a non-transitory computer-readable medium and includes computer-executable instructions. The computer-executable instructions are executed by a processor to implement the method described above.

Various aspects of the present disclosure are described herein with reference to flowcharts and/or block diagrams of the method, the apparatus, the device, the computer-readable medium, and the computer program product according to implementations of the present disclosure. It should be understood that each block in the flowcharts and/or block diagrams as well as a combination of blocks in the flowcharts and/or block diagrams may be implemented by using computer-readable program instructions.

These computer-readable program instructions may be provided to a processing unit of a general-purpose computer, a special-purpose computer, or another programmable data processing apparatus, thereby producing a machine, such that these instructions, when executed by the processing unit of the computer or another programmable data processing apparatus, produce a means for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may be loaded onto a computer, another programmable data processing apparatus, or another device, so that a series of operating steps can be performed on the computer, another programmable data processing apparatus, or another device to produce a computer-implemented process. Therefore, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple implementations of the present disclosure. In this regard, each block in the flowcharts or block diagrams may represent a module, a program segment, or a part of an instruction that contains one or more executable instructions for implementing specified logical functions. In some alternative implementations, functions labeled in the blocks may also occur in an order different from that labeled in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

As used herein, the term "determine" encompasses a variety of actions. For example, "determine" may include operating, computing, processing, exporting, surveying, searching (for example, searching in a table, database, or another data structure), identifying, and the like. In addition, "determine" may include receiving (for example, receiving information), accessing (for example, accessing data in a memory), and the like. In addition, "determine" may include parsing, selecting, choosing, establishing, and the like.

Various implementations of the present disclosure have been described above. The above description is illustrative rather than exhaustive, and is not limited to the various implementations disclosed. Multiple modifications and variations will be apparent to those of ordinary skill in the art without departing from the scope and spirit of the illustrated various implementations. The selection of terms as used herein is intended to best explain the principles and practical applications of the various implementations or the improvements to technologies on the market, or to enable other persons of ordinary skill in the art to understand the implementations disclosed here.

The invention claimed is:

1. A method for data indexing, comprising:
   obtaining a plurality of data blocks for storage;
   generating a plurality of vectorized representations of the plurality of data blocks using a representation generation model so that a difference between vectorized representations of data blocks with a higher similarity among the plurality of data blocks is smaller, wherein the representation generation model is trained based on a training triplet, the training triplet comprising a first training data block, a second training data block similar to the first training data block, and a third training data block dissimilar to the first training data block; and
   storing the plurality of vectorized representations for indexing the plurality of data blocks respectively.

2. The method according to claim 1, wherein
   the representation generation model is a neural network model.

3. The method according to claim 1, wherein
   a training target of the representation generation model is to make a difference between vectorized representations generated by the representation generation model for the first training data block and the second training data block less than a difference between vectorized representations generated for the first training data block and the third training data block.

4. The method according to claim 3, wherein the first training data block and the third training data block are selected from a data block set, and the second training data block is generated by modifying a part of the first training data block.

5. The method according to claim 1, wherein the plurality of vectorized representations are represented by numerical vectors of a same number of dimensions.

6. The method according to claim 1, wherein storing the plurality of vectorized representations comprises:
   selecting a data structure suitable for a neighbor search; and
   storing the plurality of vectorized representations according to the selected data structure.

7. The method according to claim 1, further comprising:
   obtaining a search associated with a search data block;
   generating a search vectorized representation of the search data block;
   searching the plurality of vectorized representations for at least one vectorized representation with a difference between the at least one vectorized representation and the search vectorized representation that is less than a difference threshold; and
   determining a response to the search based on at least one data block indexed by the at least one vectorized representation among the plurality of data blocks.

8. The method according to claim 7, wherein generating the search vectorized representation of the search data block comprises:
   generating the search vectorized representation of the search data block using the representation generation model.

9. An electronic device, comprising:
   at least one processor; and
   at least one memory storing computer program instructions, the at least one memory and the computer program instructions being configured to cause, with the at least one processor, the electronic device to perform actions comprising:
   obtaining a plurality of data blocks for storage;
   generating a plurality of vectorized representations of the plurality of data blocks using a representation generation model so that a difference between vectorized representations of data blocks with a higher similarity among the plurality of data blocks is smaller, wherein the representation generation model is trained based on a training triplet, the training triplet comprising a first training data block, a second training data block similar to the first training data block, and a third training data block dissimilar to the first training data block; and
   storing the plurality of vectorized representations for indexing the plurality of data blocks respectively.

10. The device according to claim 9, wherein
    the representation generation model is a neural network model.

11. The device according to claim 10, wherein
    a training target of the representation generation model is to make a difference between vectorized representations generated by the representation generation model for the first training data block and the second training data block less than a difference between vectorized representations generated for the first training data block and the third training data block.

12. The device according to claim 11, wherein the first training data block and the third training data block are selected from a data block set, and the second training data block is generated by modifying a part of the first training data block.

13. The device according to claim 9, wherein the plurality of vectorized representations are represented by numerical vectors of a same number of dimensions.

14. The device according to claim 9, wherein storing the plurality of vectorized representations comprises:
  selecting a data structure suitable for a neighbor search; and
  storing the plurality of vectorized representations according to the selected data structure.

15. The device according to claim 9, wherein the actions further comprise:
  obtaining a search associated with a search data block;
  generating a search vectorized representation of the search data block;
  searching the plurality of vectorized representations for at least one vectorized representation with a difference between the at least one vectorized representation and the search vectorized representation that is less than a difference threshold; and
  determining a response to the search based on at least one data block indexed by the at least one vectorized representation among the plurality of data blocks.

16. The device according to claim 15, wherein generating the search vectorized representation of the search data block comprises:
  generating the search vectorized representation of the search data block using the representation generation model.

17. A computer program product tangibly stored on a non-volatile computer-readable medium and comprising computer-executable instructions, wherein when executed, the computer-executable instructions cause a device to perform actions comprising:
  obtaining a plurality of data blocks for storage;
  generating a plurality of vectorized representations of the plurality of data blocks using a representation generation model so that a difference between vectorized representations of data blocks with a higher similarity among the plurality of data blocks is smaller, wherein the representation generation model is trained based on a training triplet, the training triplet comprising a first training data block, a second training data block similar to the first training data block, and a third training data block dissimilar to the first training data block; and
  storing the plurality of vectorized representations for indexing the plurality of data blocks respectively.

18. The computer program product according to claim 17, wherein the representation generation model is a neural network model.

19. The computer program product according to claim 18, wherein
  a training target of the representation generation model is to make a difference between vectorized representations generated by the representation generation model for the first training data block and the second training data block less than a difference between vectorized representations generated for the first training data block and the third training data block.

20. The computer program product according to claim 19, wherein the first training data block and the third training data block are selected from a data block set, and the second training data block is generated by modifying a part of the first training data block.

\* \* \* \* \*